United States Patent [19]

Joseph et al.

[11] Patent Number: 4,795,008
[45] Date of Patent: Jan. 3, 1989

[54] BIDIRECTIONAL QUICK-OPENING PEAK-LIMITING VALVE FOR A HYDROPNEUMATIC SUSPENSION ELEMENT

[75] Inventors: Philippe Joseph, Carpentras; Jean-Michel Perrochat, Montrouge, both of France

[73] Assignee: Societe D'Applications Des Machines Motrices, France

[21] Appl. No.: 136,887

[22] Filed: Dec. 22, 1987

[30] Foreign Application Priority Data

Dec. 26, 1986 [FR] France ............................ 86 18207

[51] Int. Cl.$^4$ ............................................. F16F 9/348
[52] U.S. Cl. .............................. 188/280; 188/322.13
[58] Field of Search ........... 188/279, 280, 311, 322.11, 188/322.13, 322.14, 322.15

[56] References Cited

U.S. PATENT DOCUMENTS

| | | | |
|---|---|---|---|
| 3,232,390 | 2/1966 | Chano | 188/280 |
| 4,010,829 | 3/1977 | Naito et al. | 188/322.14 X |
| 4,083,437 | 4/1978 | Leppich | 188/322.14 |
| 4,460,074 | 7/1984 | Muller et al. | 188/322.15 X |

Primary Examiner—Duane A. Reger
Attorney, Agent, or Firm—Sughrue, Mion, Zinn, Macpeak & Seas

[57] ABSTRACT

This valve comprises a tubular body (66) containing a hollow slide (68) mounted axially slidably in a sleeve (69), itself sliding in the body (66) along the axis (X—X) of the valve, a spring bearing on the body and pushing the slide (68) up against an annular end (73) of the sleeve (69), normally held by means of its opposite end (79) up against a cover (82) for closing the body (66) on the opposite side to its central orifice (67); the cover (82) and the sleeve (69) have radial ports (88, 81), the body (66) being contained in a tubular casing (34) having conduits (92, 96), fluid passages (89, 93, 94, 95, 40) also being provided to allow the valve to open in both directions as a result of the hydraulic pressure. This valve makes it possible to peak-limit the surplus hydraulic flow of a shock absorber (31), thus preventing the tailgating of the vehicle body at means vertical speeds under compression and making it possible under expansion, after the vehicle has passed over a hump, for the wheel to make contact with the ground again before the vehicle body.

8 Claims, 8 Drawing Sheets

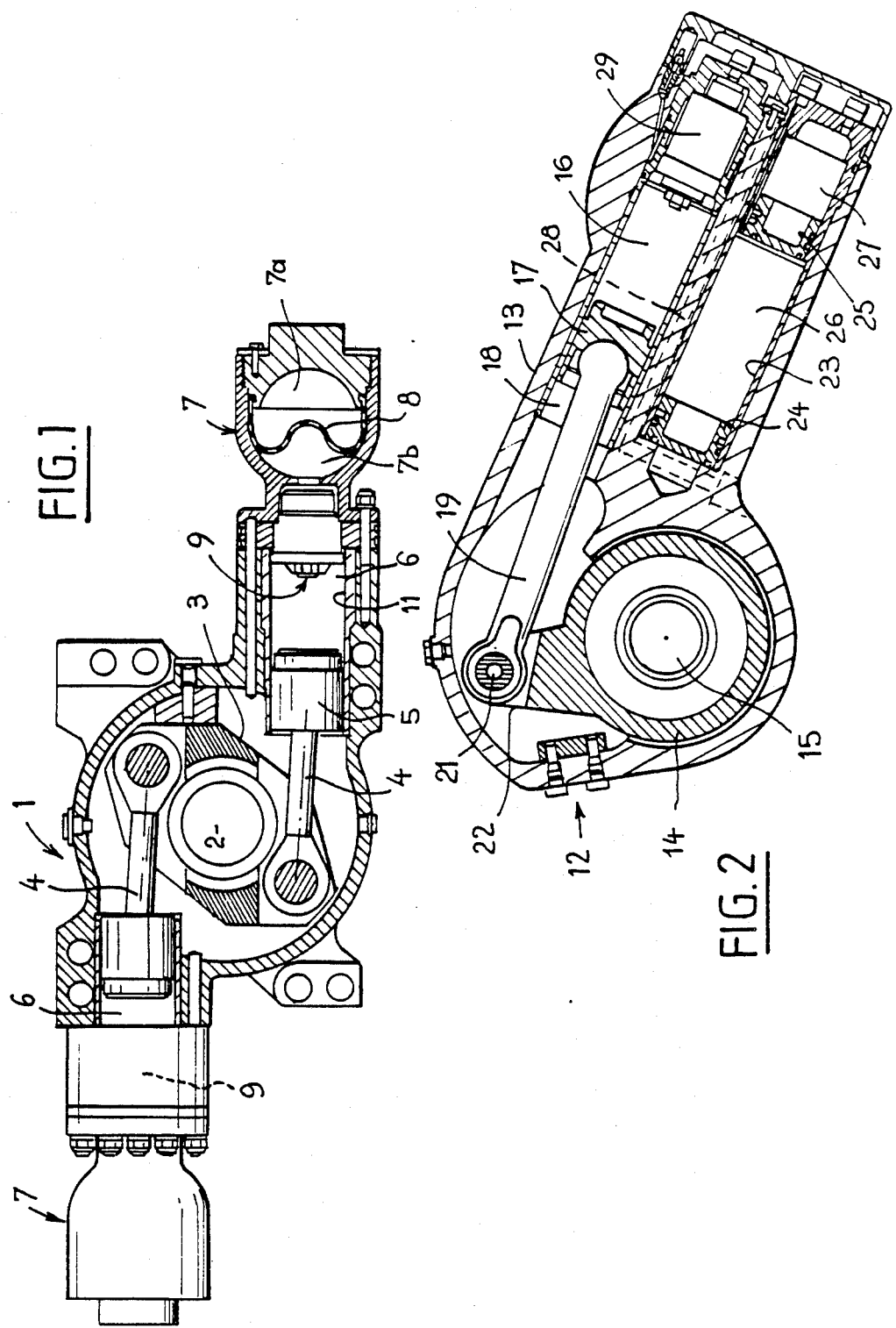

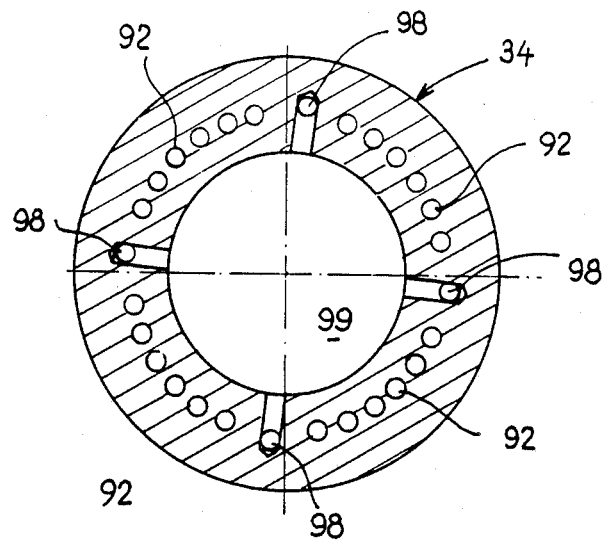
FIG.11
FIG.12
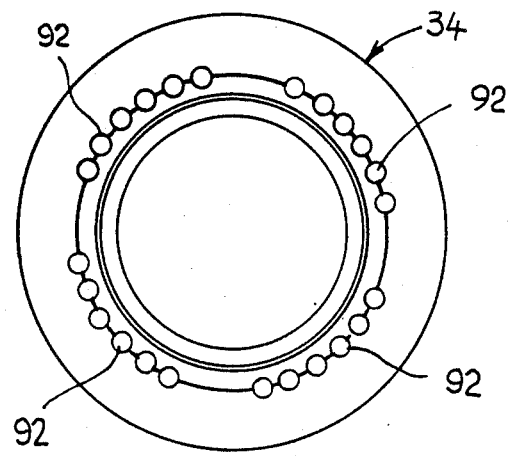

BIDIRECTIONAL QUICK-OPENING PEAK-LIMITING VALVE FOR A HYDROPNEUMATIC SUSPENSION ELEMENT

The subject of the present invention is a bidirectional quick-opening peak-limiting valve for a hydropneumatic suspension element of a vehicle, especially a heavy vehicle.

Hydropneumatic, especially oil-pneumatic vehicle suspension elements, comprising cartridges arranged in a hydraulic chamber between the piston and the gas chamber, are known. Thus, it is known to provide shock-absorbing cartridges consisting of an actual shock-absorber and of a peak-limiting valve, through which a hydraulic fluid passes alternately in the two directions during the movements of the piston in the hydraulic chamber, when the vehicle runs on uneven ground. The very rapid peaks and falls of hydraulic pressure triggered when the vehicle passes over humps and hollows are normally absorbed by the peak-limiting valve associated with the shock-absorber, at least up to a specific maximum speed.

Now it has been found that, at mean vertical speeds (approximately five to ten m/s) of the vehicle, that is to say when the suspension element operates under compression, there arises a phenomenon of tailgating of the body of the vehicle when it passes over a hump.

Conversely, after it has passed over a hump, it is found that the wheels or rollers associated with the suspension elements are braked excessively, since the hydraulic force necessary to cause the fluid to pass through the peak-limiting valve is very high. As a result, the rollers (where a tracked vehicle is concerned) or the wheels do not make contact with the ground again before the chassis of the vehicle, so that the assembly as a whole falls at the same time, this causing, once again, a highly uncomfortable jolt for the occupants of the vehicle.

The object of the invention is, therefore, to provide a peak-limiting valve which is triggered under compression at average speeds only under the effect of a force sufficient to prevent the tailgating phenomenon and which, conversely, under expansion, after the vehicle has passed over a hump, opens under the action of a force clearly below that necessary for opening the known peak-limiting valves, in order to prevent the jolt caused as a result of the simultaneous fall of the chassis and rollers or wheels.

The bidirectional quick-opening peak-limiting valve to which the invention relates comprises a tubular body having a central orifice for the passage of a hydraulic fluid, a hollow slide mounted slideably within a sleeve, itself mounted slideably in the body and being coaxial relative to the slide along the general axis of the valve, an elastic member bearing on the body and pushing the slide up against a first annular end of the sleeve by means of an annular seat of the said slide, a second annular end of the sleeve having radial orifices shut off by the slide as long as the latter is held up against the sleeve by the elastic member, and means for causing the slide to slide in the sleeve in the opposite direction to the restoring force of the elastic member and for allowing the hydraulic fluid to pass through these radial orifices when the pressure at these exceeds a specific value.

According to the invention, the valve comprises a cover which is intended for closing the tubular body on the side of the latter opposite its central orifice and which is coaxial relative to the said body, this cover has radial ports communicating with the radial orifices in the slide to allow the passage of the hydraulic fluid, and the end part of the sleeve adjacent to the cover is pressed up against the said cover by the slide, itself stressed by its elastic restoring member.

Tests conducted with this valve so designed have shown that, under compression, at average speeds the force necessary for opening the valve is much greater than that necessary for opening the prior valve, so that the phenomenon of tailgating is eliminated. Conversely, under expansion, the hydraulic force necessary for opening the valve in the opposite direction to the preceding direction is reduced considerably, so that the wheels or rollers make contact with the ground again before the body of the vehicle and jolting is also prevented.

According to one characteristic of the invention, the cover consists of a bottom and of an annular skirt, in which the said radial ports are formed and which is held up against a shoulder or inner annular projection of the body, and the cover and the body are accommodated in a tubular casing, in which are formed conduits opening into the radial ports of the cover, on the one hand, and to the outside of the casing on the opposite side to the cover and to the slide, on the other hand.

Other particular features and advantages of the invention will emerge from the following description made with reference to the accompanying drawings which illustrate an embodiment of it by way of non-limiting example and two examples of its use in hydropneumatic suspension elements:

FIG. 1 is a view half in longitudinal section and half in elevation, of a hydropneumatic suspension element which is intended particularly for a heavy vehicle and which can be equipped with a shock absorber according to the invention;

FIG. 2 is a view similar to that of FIG. 1 of a second hydropneumatic suspension element which can be equipped with a shock absorber according to the invention;

FIG. 11 is a cross-sectional view according to 11—11 of FIG. 10;

FIG. 12 is an end view in elevation according to the arrow F of FIG. 10; and

Figure 3:
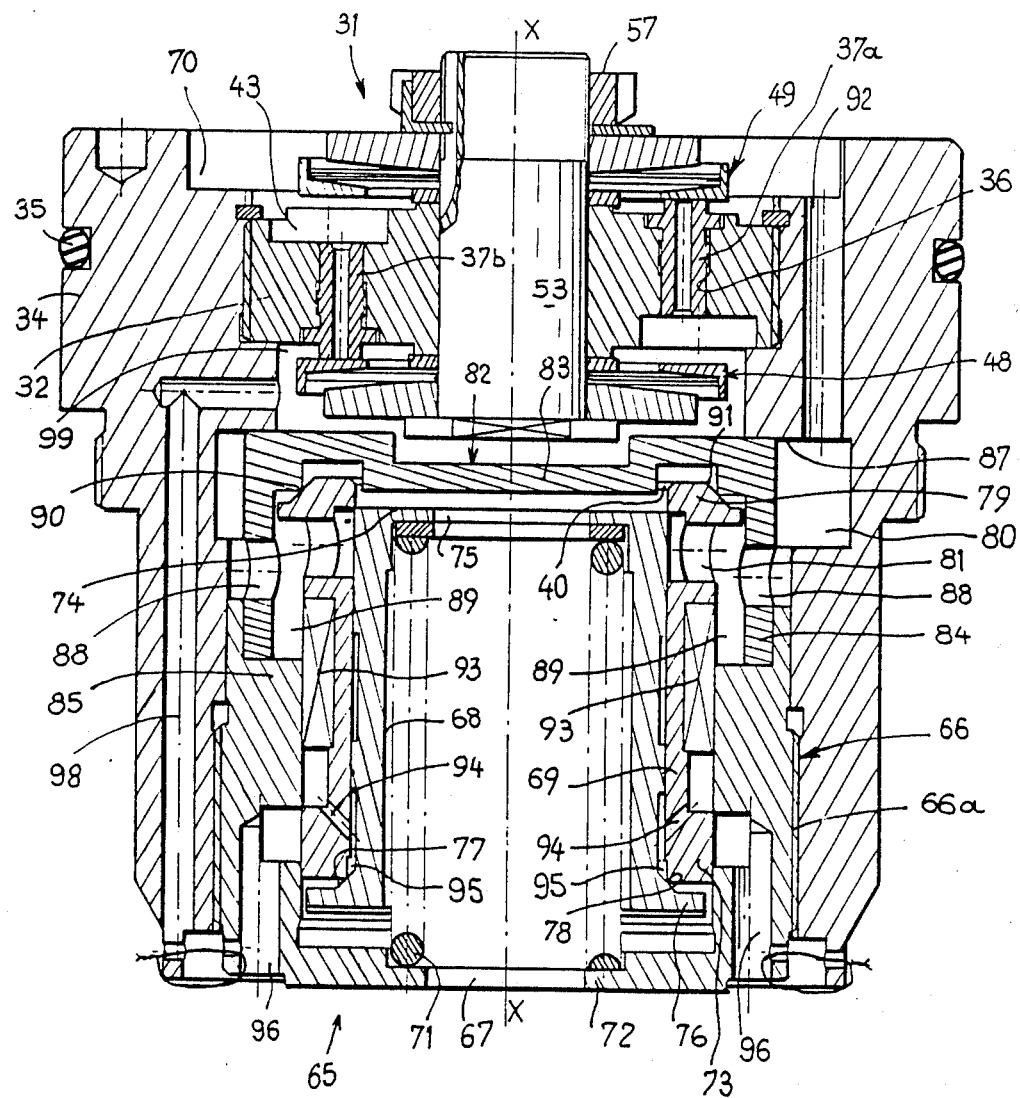
FIG. 3 is a view in axial section of a cartridge which is formed by the combination of a shock absorber and of a bidirectional quick-opening peak-limiting valve according to the invention and which is capable of equipping suspension elements, such as those of FIGS. 1 and 2, the shock absorber and the valve being shown at rest.
Figure 4:
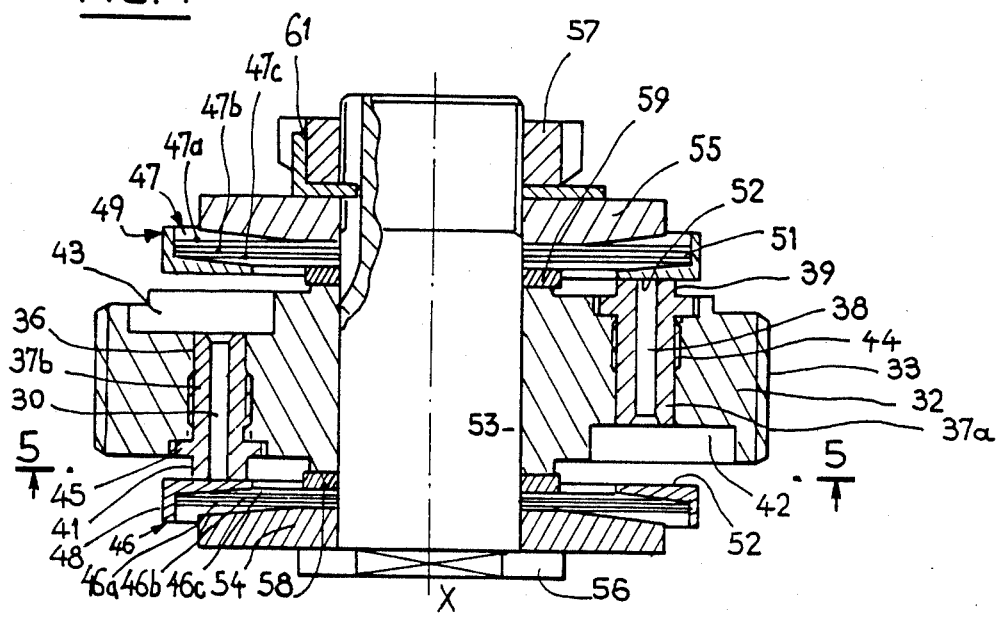
FIG. 4 is a view in axial section and partial elevation of the shock absorber of FIG. 3.

FIG. 1 shows a hydropneumatic suspension element which is described in detail in the applicant's French patent No. 83.20,063 (corresponding to U.S. Pat. No. 4,629,169) and which it is therefore not necessary to describe in detail here.

The element 1 comprises a wheel support arm 2, only a cross-section of this arm being shown here and the end of this arm opposite the part shown in the drawings being articulated on a vertically moveable roller (not shown). Articulated on a rocker 3 fixed to the arm 2 are the ends of the rods 4 of two pistons 5 capable of moving simultaneously in opposite directions within hydraulic chambers 6 during the oscillations of the arm 2. Associated with each chamber 6 are a gas accumulator 7 with a flexible diaphragm 8 separating the gas compartment 7a from the hydraulic compartment 7b communicating with the hydraulic chamber 6, and a shock-absorbing cartridge 9. The latter is accommodated in the end of the hydraulic chamber 6 opposite the piston 5, facing the hydraulic compartment 7b with which it communicates, the chamber 6 being delimited by means of a piece 11 connected sealingly to the accumulator 7.

Each cartridge 9 consists of an assembly comprising a shock absorber and a bidirectional quick-opening peak-limiting valve, and the shock absorber can advantageously conform to that which the invention relates.

FIG. 2 illustrates a second suspension element 12 for heavy vehicles, of the type which is described in the applicant's French Patent No. 85.05.067 and which will therefore not be described in detail again.

The element 12 comprises an arm 13, through which passes an axle journal (not shown) of the vehicle and which is articulated rotatably on a stationary part 14 fixed to the chassis (not shown) of the vehicle. The stationary part 14 is coaxial relative to a shaft 15 connected to the chassis, rolling means being provided between the rotary arm 13 and the stationary part 14. In the arm 13 there is a hydraulic chamber 16 which contains a sliding piston 17 separating the chamber 16 from a receptacle 18. Articulated on the piston 17, which slides sealingly in the chamber 16, is a connecting rod 19, of which the end opposite the piston 17 is articulated on a pivot pin 21 fastened transversely in a lug 22 integral with the stationary part 14.

In the arm 13 there is also a pneumatic chamber 23 which has an axis parallel to that of the hydraulic chamber 16 and in which two freely sliding pistons 24, 25 delimit two gas chambers 26, 27. On the side opposite the gas chamber 26, the piston 24 receives the hydraulic pressure coming from the chamber 16 via a connecting conduit 28, one end of which opens into the chamber 16 opposite a cartridge 29 consisting of a shock absorber and of a bidirectional peak-limiting valve. The second end of the conduit 28 communicates with the hydraulic circuit (not shown) of the vehicle.

The shock absorber and the peak-limiting valve which can form the cartridges 9 and 29 of the suspension elements of FIGS. 1 and 2 will now be described with more particular reference to FIGS. 3 to 12 (these examples of the use of the shock absorber and of the peak-limiting valve not being limiting).

A) Description of the shock absorber (FIGS. 3 to 8)

Figure 5:
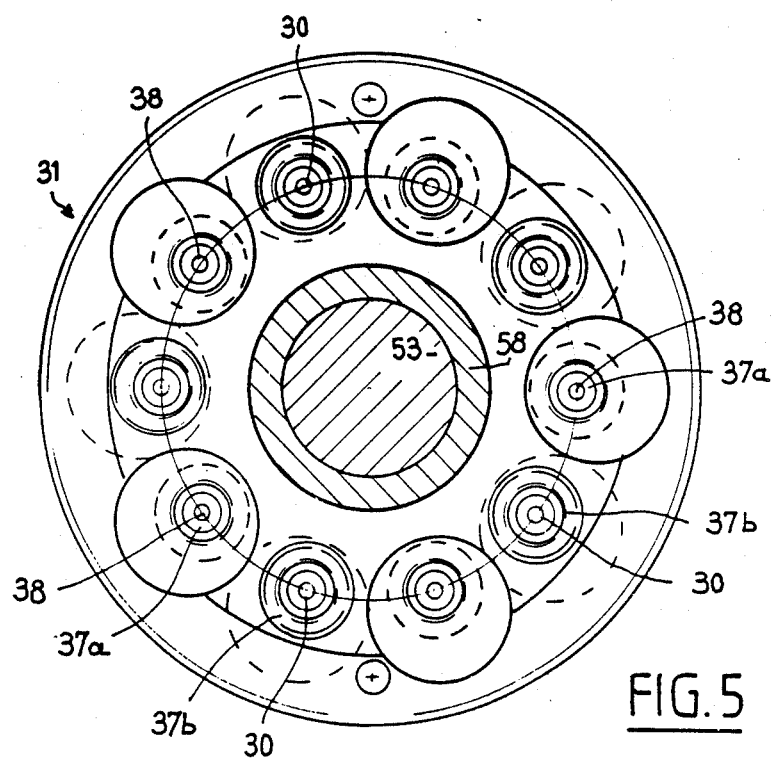
FIG. 5 is an elevation view in section along the line 5—5 of FIG. 4.

The shock absorber 31 comprises a disk 32 equipped with an external thread 33 making it possible to screw it into a tubular casing 34 having an annular gasket 35 ensuring sealing relative to the wall of the hydraulic chamber. Machined in the disk 32, the axis X—X of which is the general axis of the cartridge (9 or 29, FIGS. 1 or 2), are bores 36 which are parallel to the axis X—X and are uniformly distributed round this and in each of which is fastened a tubular insert 37a 37b, the internal port 38, 30 of which opens at its opposite ends onto the two faces of the disk 32. FIG. 5 shows that, in this example, there are ten bores 36 and corresponding inserts, but of course this number can vary. Some of the inserts, namely half of them, denoted by 37a, are equipped with respective end collars 39 projecting relative to that face of the disk 32 which confronts the hydraulic chamber, while the other inserts, designated by 37b, are each equipped with an end collar projecting relative to the opposite face of the disk 32.

The ends of the inserts 37a, 37b opposite the collars 39, 41 open into respective recesses 42, 43, made in the corresponding faces of the disk 32, these recesses 42, 43 preferably being cylindrical and offset axially relative to the axes of the corresponding inserts 37a, 37b. The recesses 42 and 43 are distributed uniformly round the axis X—X in an alternating arrangement, as are therefore the associated inserts 37a, 37b. In the example described, the recesses 43 are made on the face of the disk 32 confronting the hydraulic chamber of the suspension element, and the collars 39 diametrically opposite the recesses 43 project on this same face of the disk 32, opposite the peak-limiting valve 65 associated with the shock absorber 31. This arrangement is reversed for the recesses 42 and the associated inserts 37b. The inserts are fastened in the disk 32 by any suitable means, for example by a thread 44 screwed into an internal thread of the associated bore 36, and by an annular shoulder 45 integral with the rest of the insert 37a, 37b and projecting radially into a corresponding receptacle of the disk 32.

The shock absorber 31 is equipped with means allowing the hydraulic fluid to pass through the disk 32 in only one direction for the ports 38 of the inserts 37a and in only the opposite direction for the ports 30 of the inserts 37b. In the embodiment described, these means comprise, mounted on the two opposite faces of the disk 32, stacks 46, 47 of elastically flexible metal washers arranged in a rigid annular deflector 48, 49 located opposite the ports 38, 30 of the inserts 37a, 37b. In the example illustrated in FIG. 4, each stack 46, 47 consists of three washers 46a, 46b, 46c and 47a, 47b, 47c the outer edges of which are retained radially by means of a circular wing 51, coaxial relative to the axis X—X, of the corresponding deflector 48, 49. Each wing 51 is extended by a radial ring 52 which is perpendicular to the axis X—X and the surface of which comes up against the annular end of the respective inserts 37a and 37b.

The shock absorber 31 is completed by a screw 53 passing axially through the disk 32, the stacks of washers 46, 47 and the two deflectors 48, 49. The stacks 46, 47 and the deflectors 48, 49 are held in place by means of annular members 54, 55 through which the screw 53 passes and which are arranged up against the washers 46a etc. and 47a etc. in the region of these adjacent to the screw 53 and are themselves fixed in place respectively by means of an end washer 56 of the screw 53 and by means of a nut 57. Two washers 58, 59 are interposed between the disk 32 and the stacks 46, 47, and a third washer 61 is inserted between the nut 57 and the annular member 55.

The dimensions of the washers 46a, etc. and 47a, etc., of the two deflectors 48, 49 and of the projecting collars 39, 41 are such that the rings 52 are held elastically by means of the corresponding washers 46a, etc. and 47a, etc. against the annular surfaces of the respective collars, 39, 41 when the shock absorber 31 is at rest. In this position (FIGS. 3 and 4), the parts of the surface of the rings 52 which are not up against the collars 39, 41 are therefore at a distance from the recesses 43, 42 which is equal to the depth of these, plus the spacing between the rings 52 and the faces of the disk 32 confronting them.

This shock absorber operates as follows:

When the hydraulic pressure increases abruptly on one face of the disk 32 up to a predetermined sufficient value, the fluid moves the corresponding deflector 49 or 48 away from the corresponding collar 39 or 41, and the fluid flows to the other side of the disk 32 via the ports 38 or 30. This flow of the fluid is opposed by a hydrodynamic vacuum, generated precisely as a result of this flow between the deflector 48 or 49 and the annular surfaces of the collars 41 or 39, and the elastic restoring force exerted by the stacks of washers 46 or 47. The fluid therefore continues to flow as long as the hydraulic pressure and the upstream force so generated are greater than the hydrodynamic vacuum and the elastic restoring force of the deflector which tend to lay the latter down on the collars 39 or 41.

Now the hydrodynamic vacuum and the corresponding force exerted on the deflector are directly proportional to the annular surface of the collars 39 or 41 in contact with the particular deflector. The result of this is that, to ensure that the fluid can in fact flow from a certain hydraulic pressure, this annular contact surface must not exceed a certain value.

Conversely, if this annular surface of the inserts 37a, 37b which is in contact with the deflectors 48, 49 is too small, the bearing force of these on the collars 41, 39 risks exceeding the yield limit of the material of the inserts 37a, 37b and consequently causing bruising of the collars 39, 41. It will therefore be appreciated that the thickness of the wall of the inserts, that is to say the width of their annular surface receiving the deflectors 48, 49, must be between specific limits, depending on the materials used and on the hydraulic pressure in the chamber of the suspension element.

Figure 6:
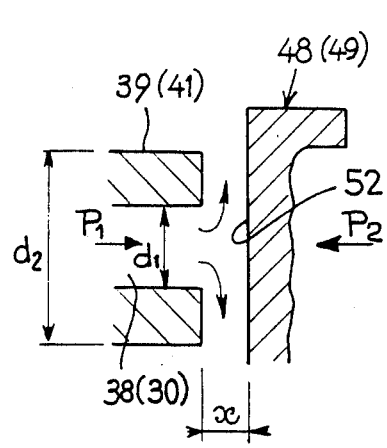
FIG. 6 is a partial sectional view of an enlarged scale of a tubular insert and of a deflector equipping the shock absorber of FIGS. 3 to 5.
Figure 10:
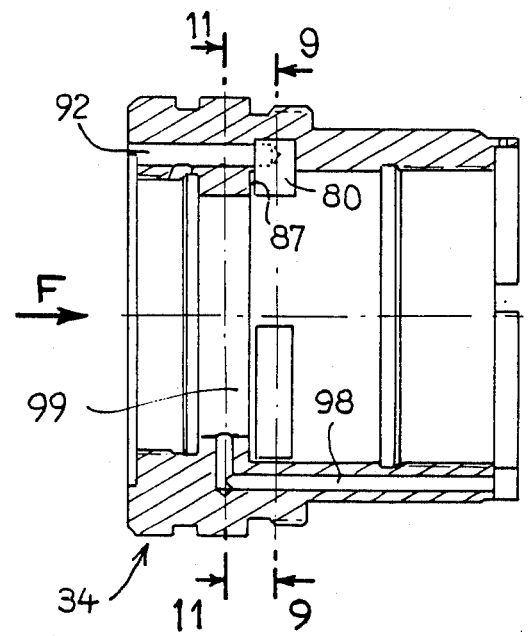
FIG. 10 is a view in axial section of an outer tubular casing forming part of the cartridge of FIGS. 3, 7 and 8.
Figure 9:
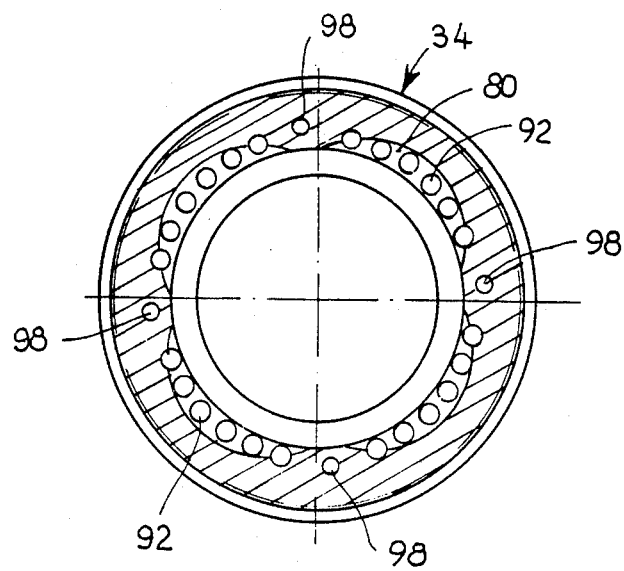
FIG. 9 is an end view of the shock absorber in an elevation according to 9—9 of FIG. 10.

Referring now to FIG. 6, these limits can be determined from the following data:

d1 = the diameter of the port 38 or 30 of the projecting collar 39, 41 of the insert 37a or 37b;

d2 = the outside diameter of the collar 39 or 41;

x = the distance between the surface of the ring 52 and the deflector 48 or 49 and the annular surface of the collar 39 or 41 when hydraulic fluid at sufficient pressure flows from the port 38 (30) towards the outside of the deflector 48 (49);

p1 = the hydraulic pressure in the port;

p2 = the hydraulic pressure in the deflector;

S = the deflector surface equal to the cross-section of the port 38 (30) and receiving the pressure p1.

The dynamic balance is obtained when the below-mentioned relation is satisfied, in this F1 being the force exerted on the surface S of the deflector by the pressure p1, F2 being the elastic restoring force of the deflector, and F3 being the force generated as a result of the hydrodynamic vacuum between the collar 39 and the deflector 48.

$$F_1 = F_2 + F_3 \, (d2d1, x)$$

hence $(p1 - p2)S = F_2 + F_3$ from which $(p1 - p2)\pi(d1/2)^2 = F_2 + \alpha \, F_2$ and $x = f[(p1 - p2)d^2; \, d1/d2]$ In fact, the hydrodynamic vacuum is also a function of the elastic restoring force $F_2$ of the deflector. However, this hydrodynamic restoring force is, first and foremost a function of the ratio d2/d1, so that if this ratio is too high, that is to say if the contact surface is too large, the deflector does not move away from the insert, or is laid down on it again immediately after moving away from it, and shuts it off permanently. Conversely, if the ratio d2/d1 is too low (being at the limit equal to one), the yield limit of the material of the insert will b reached or exceeded, and there will be bruising of the periphery of the collar 39 or 41 which will make the shock absorber unfit for operation.

Thus, the below-mentioned relation must hold true.

$$A < d2/d1 < B$$

in which A is a coefficient corresponding to the yield limit of the material of the insert and B is the value of the ratio d2/d1 from which the deflector closes again and blocks the shock absorber.

As an example to give an indication, depending on the materials used for the shock absorber and on the hydraulic pressure prevailing in the suspension element (which can reach approximately 1000 bars in some heavy vehicles , there can be $\alpha = 0.25$. It is therefore possible to determine the limiting values of the ratio d2/d1.

Of the possible alternative embodiments of the shock absorber 31, the following will be mentioned in particular: the number of elastic washers 46a–47c can vary, these washers being made of a suitable material, the same applying to the deflectors 48, 49 which can be produced preferably from steel. The number of inserts 37a, 37b and of bores 36 can also vary, and they can be fastened in a disk 32 by any suitable means.

It will be seen that the surfaces of the annular members 54, 55 facing the washers 46a–47c are first plane and then fustoconical, starting from the screw 53, in order to reserve between these washers and the said fustoconical surfaces a gap which increases up to the periphery of the members 54, 55. This arrangement allows the elastic movement necessary for the washers and the deflectors 48, 49.

(B) Description of the peak-limitnng valve (FIGS. 3 and 7 to 12)

Figure 13:
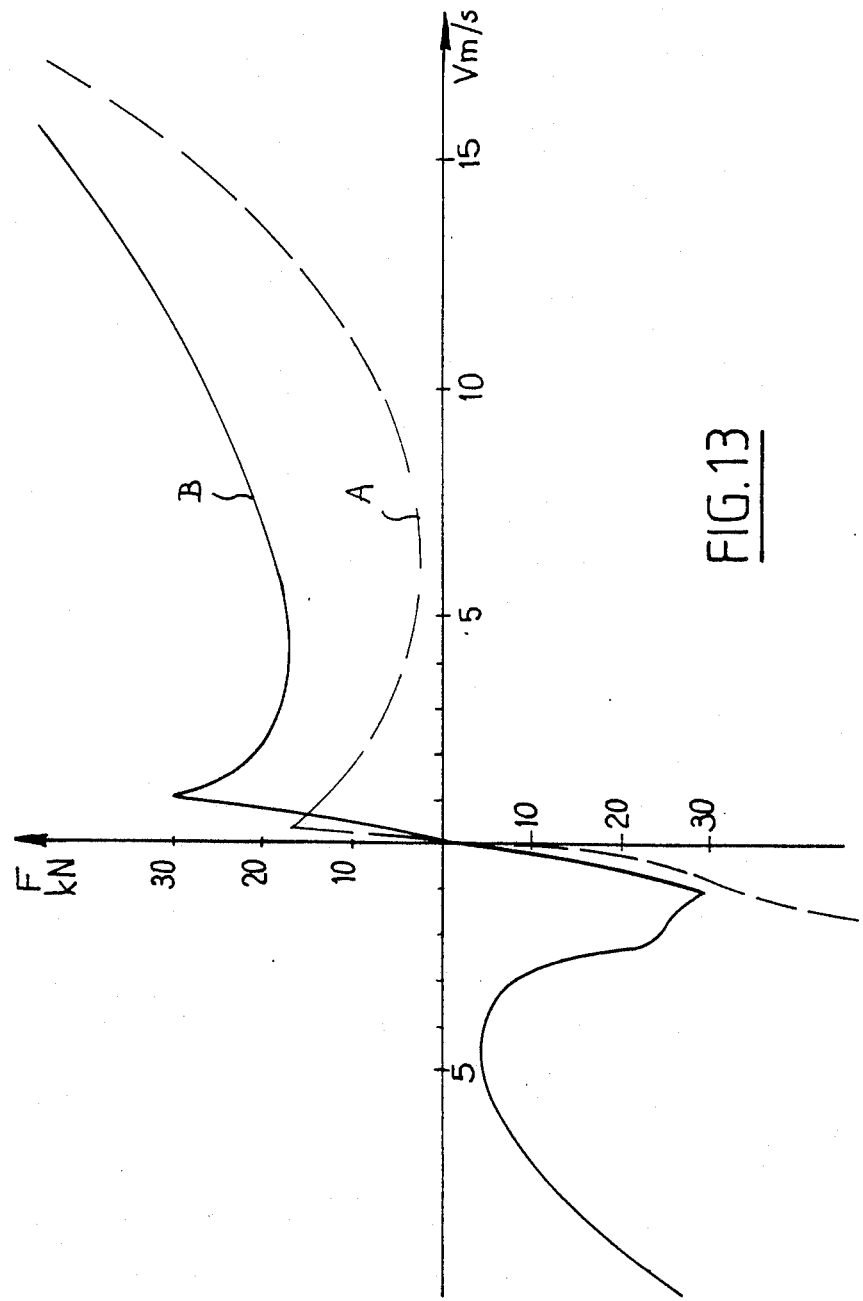
FIG. 13 is a graph illustrating the variation, as a function of the vertical speed of the vehicle wheel, in the compression and expansion force necessary for the shock absorber and the peak-limiting valve of FIGS. 3 to 12 to operate.

A two-fold disadvantage, which can be explained with reference to FIG. 13, can be seen in the known bidirectional quick-opening peak-limiting valves. FIG. 13 shows, on the ordinate, the force (in kN) necessary for opening a known peak-limiting valve as a function of the speed V of the vehicle (in m/s) that is to say as a function of the peak-limiting rate which is proportional to the speed. The part of the curve A for positive speeds (abscissa) corresponds to the compression of the fluid, while the part on the negative abscissa corresponds to expansion. The two parts of the curve A with a very steep slope (peaks) on either side of V = 0 correspond to the flow of the fluid to and fro via the shock absorber only (throttling flow).

It will be seen that, at the mean vertical speeds of the wheel, that is to say at a vehicle speed of approximately 5 to 10 m/s, the thrust necessary for opening the valve under compression is relatively low. As a result of this, when the vehicle passes over a hump at these speeds, there occurs the phenomenon of tailgating of the body of the vehicle and therefore an unpleasant jolt for its occupants. Above these speeds, the triggering force increases rapidly. On the other hand, under expansion, at negative vertical speeds of between 0 and approximately −2 m/s, it can be seen from this part of the curve A that the force necessary to ensure that fluid actually passes first into the shock absorber and then through the valve is very high. This means that, after the vehicle passes over a hump at low speed, the wheels or rollers of the vehicle do not fall back sufficiently quickly to make contact with the ground again before the body. The body and wheels as a whole therefore fall at the same time, and this causes another highly uncomfortable jolt for the occupants of the vehicle.

The peak-limiting valve 65 illustrated in FIGS. 3 and 7 to 12 is designed so that these disadvantages of the prior valves can be eliminated.

The valve 65 is accommodated in the tubular casing 34 containing the shock absorber 31 (the latter can be replaced by any other suitable shock absorber) and comprises a tubular body 66 screwed into the casing 34 by means of a thread 66a and having a central orifice 67 on that side of the bottom of the hydraulic chamber opposite the piston, that is to say on the same side as the accumulator (in FIG. 1: chamber 6, piston 5 and accumulator 7), this orifice 67 being intended for the passage of the hydraulic fluid.

The valve 65 also possesses a hollow slide 68 mounted slideably along the general axis X—X of the valve 65 and of the shock absorber 31 within a sleeve 69, itself mounted slideably along the axis X—X in the body 66 and being coaxial relative to the slide 68. An elastic member consisting, in this example, of a helical spring 71 bears on an annular shoulder 72 of the body 66 delimiting the central orifice 67 and pushes the slide 68 up against a first annular end 73 of the sleeve 69. For this purpose, the end of the spring 71 opposite the orifice 67 bears on a second annular shoulder 74 of the slide 68, formed at its end opposite the orifice 67 and delimiting a second central orifice 75 in the slide 68. The end part 76 of the slide 68 adjacent to the orifice 67 and consisting of a radial flange has a fustoconical annular seat 77 normally held up against an end edge 78 of the sleeve 69 by means of the spring 71.

The second annular end 79 of the sleeve 69 opposite the end part 76 has radial orifices 81 shut off by the slide 68 as long as the latter is held up against the sleeve 69 by means of the spring 71.

Figure 7:
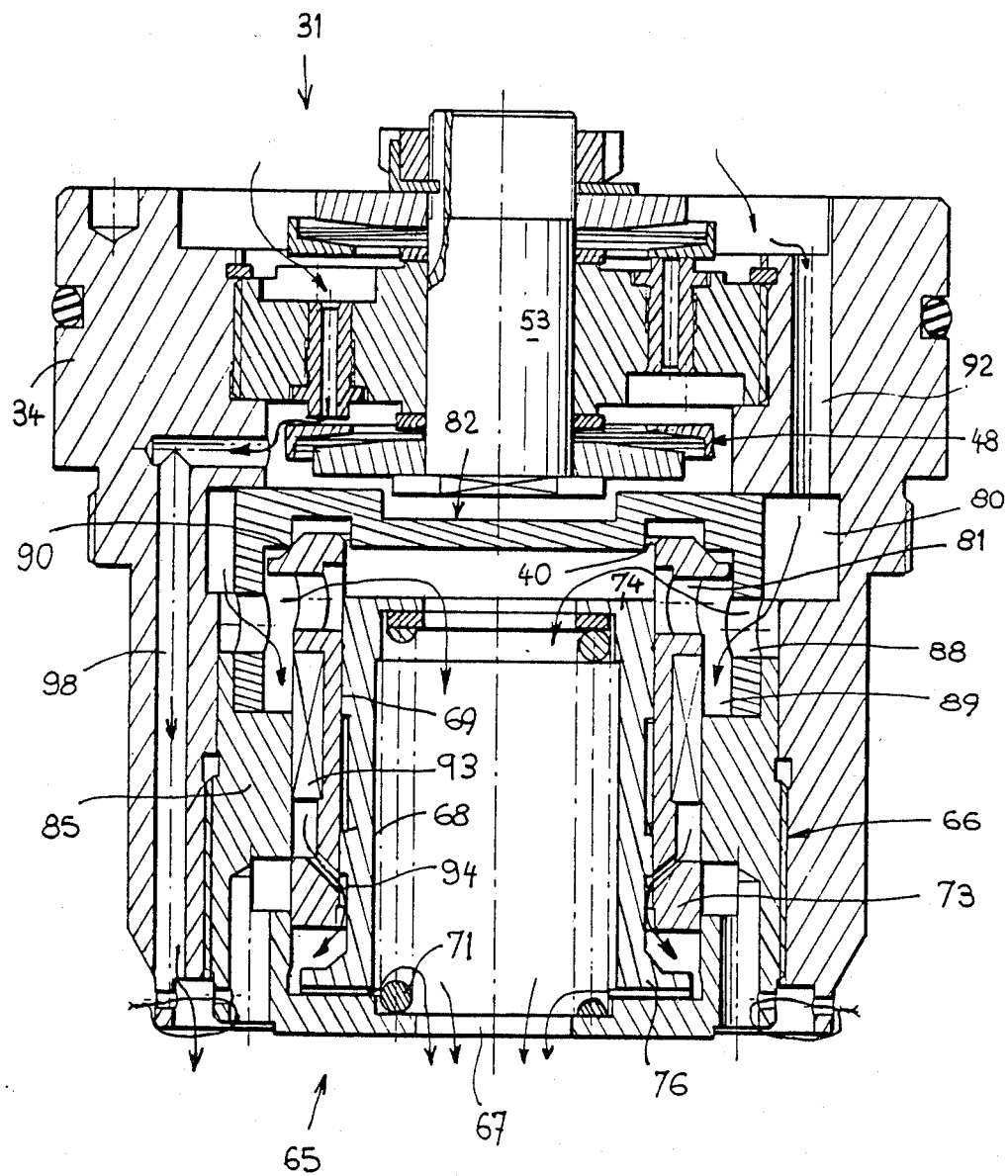
FIGS. 7 and 8 are views similar to that of FIG. 3, showing the shock absorber and the valve respectively in the position of compression and of expansion of the hydraulic fluid.
Figure 8:
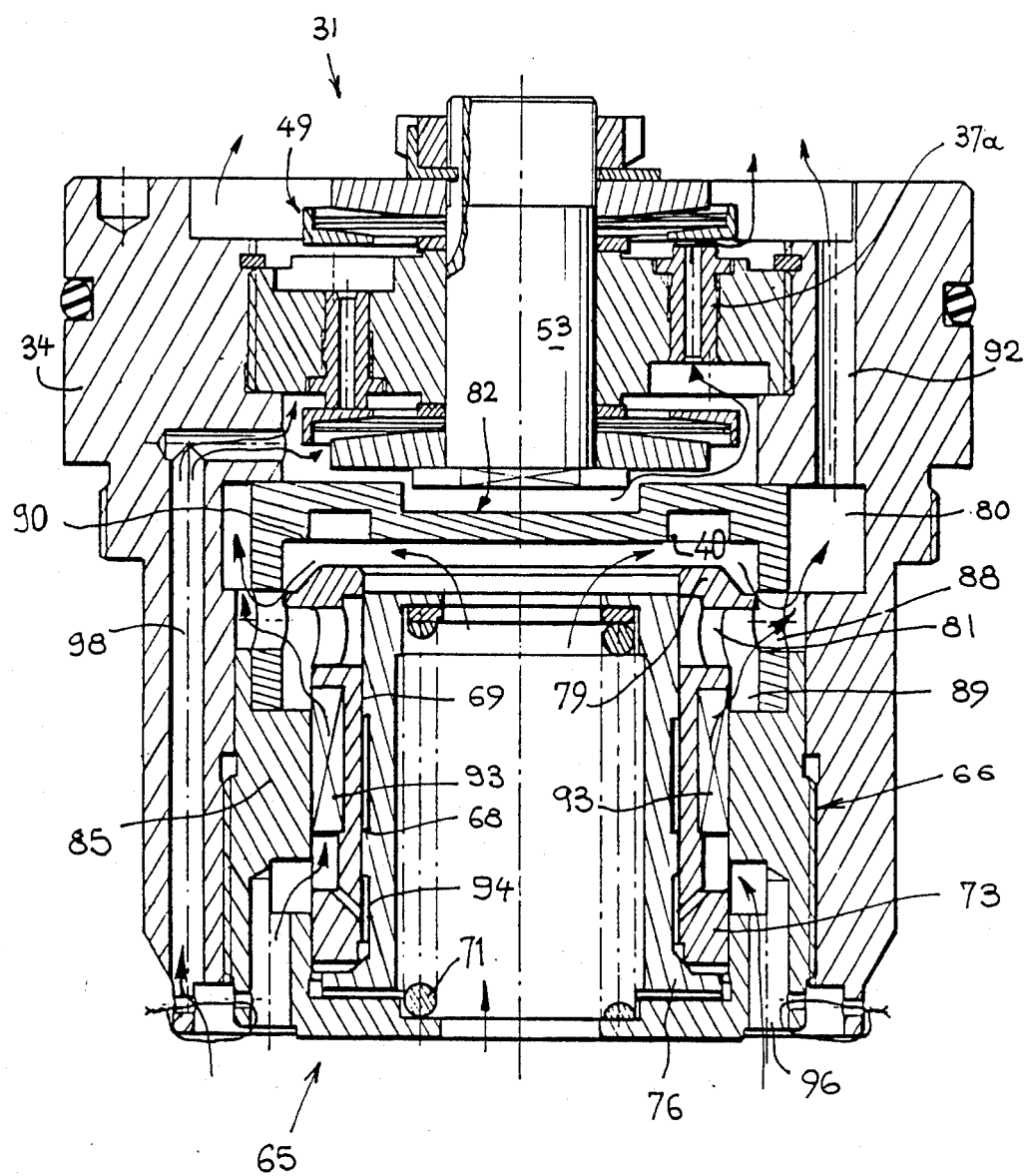

Furthermore, the valve 65 possesses a cover 82 for closing the body 66 on the side of the latter opposite its central orifice 67, that is to say on the same side as the orifice 75 in the slide 68. The cover 82, consisting of a bottom 83 perpendicular to the axis X—X and of an annular skirt 84 coaxial relative to the axis X—X, is fastened between a cylindrical inner shoulder 85 of the body 66 and another annular shoulder 87 of the casing 34. The periphery of the bottom 83 is therefore up against the shoulder 87, while the annular end of the skirt 84 is up against the shoulder 85 (FIGS. 3, 7 and 8). In the skirt 84 are formed radial ports 88 communicating with the radial orifices 81 via corresponding chambers 89 delimited between the sleeve 69 and the skirt 84.

The end part 79 of the sleeve 69 adjacent to the cover 82 has a fustoconical seat 91 for bearing on a circular edge 90 which belongs to the cover 82 and up against which it is stressed by the end 76 of the slide 68, itself stressed by the spring 71. The annular cross-section of the seat 91 is greater than the annular cross-section of the seat 77 for the bearing of the slide 68 against the end part 73 of the sleeve 69. Longitudinal conduits 92 which are made in the casing 34 and are distributed around the axis X—X, and of which there are 24 in this example (FIG. 12), open, on the one hand, into chambers 80 (FIG. 9) communicating with the ports 88 and, on the other hand, into a cavity 70 of the casing 34 and into the hydraulic chamber of the suspension element, in the region of the deflector 49 of the shock absorber 31, that is to say on the opposite side of the casing 34 to the cover 82.

Longitudinal conduits 93 are arranged in the sleeve 69 and communicate, on the one hand, with the chambers 89 and, on the other hand, with transverse bores 94 located in the sleeve 69 and adjacent to its end part 73. The bores 94 themselves communicate with longitudinal clearances 95 reserved between the adjacent end 76 of the slide 68 and the end part 73 of the sleeve 69. These clearances 95 are closed by means of the annular seat 77 for the bearing of the slide 68 on the edge 78 of the sleeve 69 as long as the slide 68 is laid up against the said sleeve 69.

Longitudinal conduits 96 made in the body 66 open out, at one of their ends, on the side opposite the cover 82, while their opposite ends are shut off by the corresponding end 73 of the sleeve 69 when the latter is up against the cover 82 by means of its seat 91.

The annular shoulder 85 of the body 66 delimits, on the one hand, the chambers 89, and, on the other hand, the longitudinal conduits 96 and, by means of the inner wall of its shoulder 85, the longitudinal conduits 93 in the sleeve 69.

Longitudinal conduits 98, of which there are four in this example, are formed in the casing 34, and their ends open respectively onto the face of the casing 34 opposite the cover 82 and into a receptacle 99 located inside the casing 34 and containing the shock absorber 31 for throttling the hydraulic fluid.

The peak-limiting valve 65 just described operates as follows.

1 At rest, the valve 65 is in the position shown in FIG. 3. The hydraulic pressures are balanced on either side of the valve, the spring 71 keeps the slide 68 up against the sleeve 69 by means of its seat 77 laid against the edge 78, so that the clearances 95 are closed, the sleeve 69 is up against the edge 90 of the cover 82 by means of its seat 91, and the radial orifices 81 are closed by the slide 68. There can therefore be no passage of fluid through the valve 65.

2 - Operation of the valve 65 under compression (FIG. 7)

If a sudden increase in the hydraulic pressure beyond a specific value occurs in the chamber of the suspension element, same of the fluid moves the deflector 48 away from the inserts 77b and therefore enters the receptacle 99, from which it flows via the conduits 98 towards the opposite side of the valve 65, that is to say towards the accumulator.

Another fraction of the fluid flows by way of the conduits 92, the chamber 80, the ports 88, the chambers 89, the conduits 93, the bores 94 and the clearances 95. The pressure exerted on the slide 68 in the clearances 95 then moves the seat 77 away from the edge 78 and consequently the slide 68 away from the sleeve 69, the end 76 of the slide 68 coming up against that of the body 66. Because of this, a small stream of fluid flows off from the clearances 95 between the ends 73 and 76 and then between the end 76 and the body 66 and passes out via the orifice 67. At the same time, hydraulic fluid flows through the open ports 81 between the end 79 of the sleeve 69 and the adjacent end 74 of the slide 68. This fluid therefore passes through the slide 68 which it leaves via the orifice 67.

The various paths followed by the fluid during compression are symbolized by the arrows marked in FIG. 7, most of it flowing via the conduits 92 and the valve 65.

The curve B of FIG. 13 illustrates an example of the operation of the assembly composed of the valve 65 and of the shock absorber 31: it can be seen that, at low positive speeds (compression) below approximately 1 m/s, the shock absorber 31 suffices to ensure that fluid passes via the conduits 98, while at higher vehicle speeds the valve 65 opens and its peak-limiting flow is added to the throttling flow of the shock absorber 31.

The throttling peak is clearly higher than that of the curve A, and the curve B shows that the force necessary for opening the valve 65 is likewise much greater than that of the known prior valves (curve A), thus preventing the harmful phenomenon of tailgating explained above.

3 - Operation of the peak-limiting valve 65 under expansion (FIG. 8).

In this case, a sudden hydraulic pressure peak occurs within the slide 68 after the vehicle has passed over a hump. The pressure is exerted on the bottom 83 of the cover 82 and then on the seat 91 of the sleeve 69 as a result of an annular passage gap 40 reserved between the end part 79 of the sleeve 69 and the bottom 83. Since the annular cross-section of the seat 91 is greater than that of the seat 77, on which the same pressure is exerted, between the ends 73 and 76 of the sleeve 69 and of the slide 68, the differential pressure thus generated at the seat 91 moves the latter away from the edge 90, whereas the seat 77 remain laid against the edge 78. The sleeve 69 slides and drives the slide 68 up against the annular end of the body 66. Because of this, the hydraulic fluid enters the chambers 89, the ports 88 and the chamber 80 and from there flows into the hydraulic chamber via the conduits 92.

At the same time, another fraction of the fluid flows from the conduits 96 into the conduits 93 via the open gap between the body 66 and the sleeve 69 and r from there into the conduits 92 via the ports 88, while the throttling flow of the fluid flows via the conduits 98, the receptacle 99 and the inserts 37a, at the same time moving these away from the deflector 49.

Most of the peak-limiting flow of the valve 65 passes laterally through the conduits 96, 93, the chambers 89 and the ports 88 and not between the cover 82 and the end 79 of the sleeve 69.

The valve 65 absorbs the surplus of the throttling flow of the shock absorber 31, and this surplus flows through the conduits 98.

The part of the curve B of FIG. 13 corresponding to negative abscissae shows that the force necessary for opening the valve 65 under expansion is first slightly less than the corresponding force for the curve A and then decreases rapidly beyond the speed of 1 m/s up to approximately 5 m/s, and this means that, immediately after the vehicle has passed over a hump, the wheel or roller associated with the suspension element falls again much more quickly than with a prior valve (curve A), thus preventing the abovementioned jolt when the vehicle body comes to rest on the suspension element again.

There can be many alternative versions of the invention. Thus, it is clear that the shape of the closing cover 82 and the number of bores 94, conduits 93, ports 88 and conduits 92 and 98 can vary.

The peak-limiting valve according to the invention can be used in the suspension element described in the abovementioned French patents and in torsion-bar or helical-spring shock absorbers and, in general, any shock absorber with an elastic system.

Finally, the peak-limiting valve on the shock absorber described above can be used in all motor vehicles, particularly heavy vehicles.

What is claimed is:

1. Bidirectional quick-opening peak-limiting valve (65) for a hydropneumatic suspension element of a vehicle (1, 12), comprising a tubular body (66) having a central orifice (67) for the passage of the hydraulic fluid, a hollow slide (68) mounted slideably within a sleeve (69), itself mounted slideably in the body (66) and being coaxial relative to the slide (68) along the general axis (X—X) of the valve (65), an elastic member (71) bearing of the body (66) and pushing the slide up against a first annular end (73) of the sleeve (69) by means of an annular seat (77) of the said slide (68), a second annular end (79) of the sleeve (69) having radial orifices (81) shut off by the slide (68) as long as the latter is held up against tee sleeve (69) by the elastic member (71), and means for causing the slide to slide in the sleeve in the opposite direction to the restoring force of the elastic member (11) and for allowing the hydraulic fluid to pass through these radial orifices (81) when the pressure at these exceeds a specific value, characterized in that it comprises a cover (82) which is intended for closing the tubular body (66) on the side of the latter opposite its central orifice (67) and which is coaxial relative to the said body (66), in that this cover (82) has radial ports (88) communicating with the radial orifices (81) in the slide (68) to allow the passage of the hydraulic fluid, and the end part (79) of the sleeve (69) adjacent to the cover (82) is stressed up against the said cover by the slide (68), itself stressed by its elastic restoring member (71).

2. Valve according to claim 1, characterized in that the cover (82) consists of a bottom (83) and of an annular skirt (84), in which the said radial ports (88) are formed and which is held up against an inner annular shoulder (85) of the body (66), and the cover (82) and the body (66) are accommodated in a tubular casing (34), in which are formed conduits (92) opening into the radial ports (88) of the cover (82), on the one hand, and to the outside of the casing (34) on the opposite side to the cover (82) and to the slide (68), on the other hand.

3. Valve according to claim 2, characterized in that the cover (82) is fastened between the abovementioned shoulder (85) of the body((66) and a bearing surface delimited by an annular surface (87) of the casing (34), and the end part (79) of the sleeve (69) adjacent to the cover (82) has a seat (91) bearing on an edge (92) of the latter, the cross-section of which is larger than the annular cross-section of the seat (77) for the bearing of the slide (68) on the opposite end (73) of the sleeve (69), an annular gap (40) moreover being reserved, independently of the hydraulic pressure, between the end part (79) of the sleeve (69) and the bottom (83) of the cover (82), to allow the passage of the fluid to the seat (91) for the bearing of the sleeve (69) on the edge (92) of the cover (82).

4. Valve according to claim 2 characterized in that longitudinal conduits (93) are arranged in the sleeve (69) and communicate, on the one hand, with chambers (89) into which open the radial ports (81, 88) of the slide (68) and the radial orifices (88) of the sleeve and, on the other hand, with transverse bores (94) in the sleeve (69) which themselves communicate with longitudinal clearances (95) reserved between the adjacent end (76) of the slide (68) and the said first end (73) of the sleeve (69), these clearances (95) being closed by the seat (77) for the bearing of the slide (68) on the sleeve (69) when the slide is laid up against the said sleeve.

5. Valve according to claim 4, characterized in that longitudinal conduits (96) made in the body (66) open out, at one of their ends, on the opposite side of the body to the cover (82), while their opposite ends are shut off by the first annular end (73) of the sleeve (69) when the latter is up against the cover (82).

6. Valve according to claim 5, characterized in that the annular shoulder (85) of the body (66) delimits, in a longitudinal direction, the chambers (89) communicating with the ports (81) of the sleeve (69) and the orifices (88) in the cover (82), as well as the longitudinal conduits (96) in the body (66) and, in the radial direction, the said longitudinal conduits (93) of the sleeve (69).

7. Valve according to claim 2 characterized in that longitudinal conduits (98) are formed in the casing (34), and their opposite ends open respectively onto the face of the casing (34) opposite the cover (82) and into an inner receptacle (99) located in the casing (34) and containing a shock absorber (31) for throttling the hydraulic fluid.

8. Bidirectional quick-opening peak-limiting and shock-absorbing device for a hydropneumatic vehicle suspension element (1, 12), characterized in that it is formed by the combination of a valve (65) according to claim 1, and a shock absorber (31); said shock absorber comprising a disk (32) fastened in an outer casing (34) and accommodating said valve (65) and having ports (30, 38) for the passage of the hydraulic fluid on either side of the disk, means (48, 49, 37a, 37b) allowing this passage in only one direction for some ports (30) and in the opposite direction for the other ports (38), and elements (53, 54, 55) for fastening said last-mentioned means to the disk, characterized in that said last-mentioned means comprises, mounted on the two opposite faces of the disk (32), stacks (46, 47) of elastically flexible metal washers (46a–46c; 47a–47c) arranged in rigid annular deflectors (48, 49) located opposite the hydraulic-fluid passage ports (30, 38).

* * * * *